United States Patent
Irie

(10) Patent No.: US 10,216,076 B2
(45) Date of Patent: Feb. 26, 2019

(54) CERAMIC COMPOSITE, PHOSPHOR FOR PROJECTOR INCLUDING THE SAME, AND LIGHT EMITTING DEVICE FOR PROJECTOR INCLUDING THE SAME

(71) Applicant: COORSTEK KK, Tokyo (JP)

(72) Inventor: Masaki Irie, Kanagawa (JP)

(73) Assignee: COORSTEK KK, Tokyo (JP)

( * ) Notice: Subject to any disclaimer, the term of this patent is extended or adjusted under 35 U.S.C. 154(b) by 21 days.

(21) Appl. No.: 15/643,996

(22) Filed: Jul. 7, 2017

(65) Prior Publication Data

US 2018/0011393 A1 Jan. 11, 2018

(30) Foreign Application Priority Data

Jul. 8, 2016 (JP) ................. 2016-136071
Jun. 30, 2017 (JP) ................. 2017-129496
Jul. 5, 2017 (JP) ................. 2017-131614

(51) Int. Cl.
*G03B 21/20* (2006.01)
*C09K 11/77* (2006.01)
*F21V 9/30* (2018.01)
*F21Y 115/10* (2016.01)

(52) U.S. Cl.
CPC ........ *G03B 21/204* (2013.01); *C09K 11/7721* (2013.01); *F21V 9/30* (2018.02); *F21Y 2115/10* (2016.08)

(58) Field of Classification Search
CPC .................. G03B 21/204; C09K 11/7721
USPC .......................................... 362/84
See application file for complete search history.

(56) References Cited

U.S. PATENT DOCUMENTS

| 2009/0072700 A1* | 3/2009 | Kameshima | C03C 14/004 313/483 |
| 2011/0227477 A1* | 9/2011 | Zhang | B32B 18/00 313/503 |
| 2012/0195340 A1* | 8/2012 | Cheon | H01L 33/501 372/50.1 |

FOREIGN PATENT DOCUMENTS

JP 2015-138136 7/2015

* cited by examiner

*Primary Examiner* — Toan Ly
(74) *Attorney, Agent, or Firm* — Procopio, Cory, Hagreaves & Savitch LLP

(57) ABSTRACT

A ceramic composite contains inorganic materials and includes a phosphor phase including YAG containing Ce, and a scatterer phase including a translucent ceramic, in which the phosphor phase is contained in an amount of 90 vol % or more and 99 vol % or less, and the scatterer phase is contained in an amount of 1 vol % or more and 10 vol % or less.

12 Claims, No Drawings

US 10,216,076 B2

CERAMIC COMPOSITE, PHOSPHOR FOR PROJECTOR INCLUDING THE SAME, AND LIGHT EMITTING DEVICE FOR PROJECTOR INCLUDING THE SAME

TECHNICAL FIELD

The present invention relates to a ceramic composite suitable for a light source for a projector.

BACKGROUND ART

Recently, a light emitting device using a light emitting diode (LED) and a phosphor has been proposed in order to miniaturize a projector.

Patent Literature 1 describes a fluorescent wheel for a projector, which can be produced by providing a ring-like phosphor layer and a transparent material layer on a ring-like rotatable transparent substance, and a light emitting device. Further, Patent Literature 1 describes, as the phosphor layer, one kind or more of phosphor selected from an oxide phosphor, a nitride phosphor, an oxynitride phosphor, a chloride phosphor, an oxychloride phosphor, a sulfide phosphor, an oxysulfide phosphor, a halide phosphor, a chalcogenide phosphor, an aluminate phosphor, a halophosphoric acid chloride phosphor, and a garnet-based compound phosphor, and as the transparent material layer, a glass matrix of borosilicate based glass, phosphate based glass or the like, and describes that a content of the phosphor is 5 to 80 vol %.

In the phosphor layer and the transparent material layer described in Patent Literature 1, it is intended to radiate heat from the phosphor due to use of the transparent substrate having high thermal conductivity. However, the effect of heat radiation is not satisfactory because glass having low thermal conductivity is used in the phosphor layer. Therefore, there is a problem that light emission efficiency deteriorates due to heat generation of the phosphor.

In addition, the content of the phosphor is as low as at most 80%, and therefore, excitation light cannot be absorbed satisfactorily. Thus, there is another problem in conversion efficiency.

CITATION LIST

Patent Literature

Patent Literature 1: JP-A-2015-138136

SUMMARY OF INVENTION

Problem that the Invention is to Solve

An object of the present invention is to provide a ceramic composite suitable for a light source for a projector.

Means for Solving the Problem

A ceramic composite according to the present invention is a ceramic composite containing inorganic materials and including a phosphor phase including YAG containing Ce, and a scatterer phase including a translucent ceramic, in which the phosphor phase is contained in an amount of 90 vol % or more and 99 vol % or less, and the scatterer phase is contained in an amount of 1 vol % or more and 10 vol % or less.

A ceramic composite according to the present invention is a ceramic composite containing inorganic materials and including a phosphor phase including $BAl_5O_{12}$ containing Ce (B is at least one kind selected from rare earth elements excluding Ce), and a scatterer phase including a translucent ceramic, in which the phosphor phase is contained in an amount of 90 vol % or more and 99 vol % or less, and the scatterer phase is contained in an amount of 1 vol % or more and 10 vol % or less.

In the ceramic composite, it is preferable that the phosphor phase has an average crystal particle size of 1 μm or more and 15 μm or less, and the scatterer phase has an average crystal particle size of 0.5 μm or more and 2 μm or less.

According to the present invention, by having the aforementioned configuration, it is possible to obtain a ceramic composite excellent in light emission efficiency.

A phosphor for a projector according to the present invention includes a phosphor layer including the aforementioned ceramic composite.

A light emitting device for a projector according to the present invention includes the aforementioned phosphor for a projector, and a light source by which the phosphor layer of the phosphor is irradiated with an excitation light.

Advantage of the Invention

The ceramic composite according to the present invention, when irradiated with blue light, can convert the wavelength efficiently to suppress loss in light emission intensity. Therefore, the ceramic composite according to the present invention can be used suitably for a phosphor and a light emitting device for a projector.

MODE FOR CARRYING OUT THE INVENTION

A ceramic composite according to the present invention will be described in detail.

The ceramic composite according to the present invention includes inorganic materials, and includes a phosphor phase including YAG containing Ce (hereinafter referred to as "YAG:Ce") or $BAl_5O_{12}$ containing Ce (B is at least one kind selected from rare earth elements excluding Ce), and a scatterer phase including translucent ceramic.

In the ceramic composite, a content of the phosphor phase is 90 vol % or more and 99 vol % or less, preferably 95 vol % or more and 99 vol % or less, in the total 100 vol % of the scatterer phase and the phosphor phase. On the other hand, a content of the scatterer phase is 1 vol % or more and 10 vol % or less, preferably 1 vol % or more and 5 vol % or less, in the total 100 vol % of the scatterer phase and the phosphor phase. Inevitable impurities are allowed up to 300 ppm.

When the content of the scatterer phase exceeds 10 vol %, the content of the phosphor phase is lower than 90 vol %, which is relatively low, and hence there may be cases where satisfactory light emission efficiency cannot be obtained. On the contrary, when the content of the scatterer phase is lower than 1 vol %, the content of the phosphor phase exceeds 99 vol %, which is significantly high, and hence excitation light is easily propagated in the phosphor phase to increase the size of a light emitting spot. Thus, the quantity of light that can be condensed is decreased.

The phosphor phase includes YAG:Ce or $BAl_5O_{12}$ containing Ce (B is at least one kind selected from rare earth elements excluding Ce). Rare earth elements in the $BAl_5O_{12}$ (B is at least one kind selected from rare earth elements excluding Ce) are not limited especially, but preferably include at least one kind selected from Y, Lu and Gd. Specifically, $Y_3Al_5O_{12}$:Ce, $Y_{2.9}Gd_{0.1}Al_5O_{12}$:Ce, $Lu_3Al_5O_{12}$:Ce and $Lu_1Y_2Al_5O_{12}$:Ce are more preferable. The Ce content of the YAG:Ce or $BAl_5O_{12}$ containing Ce (B is at least one kind selected from rare earth elements excluding Ce) is preferably 0.1 mol % or more and 1 mol % or less, and more preferably 0.2 mol % or more and 0.5 mol % or less. When the Ce content of the YAG:Ce or $BAl_5O_{12}$ containing Ce (B is at least one kind selected from rare earth elements excluding Ce) is within the aforementioned range, the wavelength can be converted efficiently, and loss in emission intensity can be suppressed.

It is preferable that an average crystal particle size of the phosphor phase is 1 μm or more and 15 μm or less. Further, the average crystal particle size of the phosphor phase is more preferably 2 μm or more and 5 μm or less. Within these ranges, sufficient light emission efficiency can be achieved, no light emission unevenness occurs, and more excellent effect of the mechanical strength can be obtained.

On the other hand, the translucent ceramic composing the scatterer phase is a ceramic that can transmit fluorescence emitted by the phosphor phase. An average crystal particle size of the scatterer phase is preferably 0.5 μm or more and 2 μm or less. Further, the average crystal particle size of the scatterer phase is more preferably 1 μm or more and 1.5 μm or less.

In the ceramic composite according to the present invention, it is preferable that the particle size of the phosphor phase is larger than that of the scatterer phase. In the case where the particle size of the phosphor phase is larger than that of the scatterer phase, scattering of excitation light can be increased.

In addition, it is preferable that each of the crystal particle size of the phosphor phase and the crystal particle size of the scatterer phase is uniform to prevent light scattering loss.

In addition, it is preferable that crystal particles in the scatterer phase are not adjacent to each other, but are dispersed in the ceramic composite.

For example, $Al_2O_3$, $MgAl_2O_4$, $TiO_2$, $Y_2O_3$, etc. may be used as the scatterer phase. Of those, $Al_2O_3$ is preferred in terms of thermal conductivity, transparency, and dispersion. In addition, when such a material is used as the scatterer phase, the ceramic composite can be composed of inorganic materials. Thus, the life of the ceramic composite is prolonged, and the ceramic composite is superior in heat resistance, water resistance, formability, etc.

Such the ceramic composite can be manufactured in a well-known process. For example, it can be manufactured in a spray granulation process. The baking temperature is 1,500 to 1,800° C., and the baking time is 30 to 180 minutes.

The obtained ceramic composite preferably has a thickness of 0.05 mm to 1 mm. When the ceramic composite has a thickness of less than 0.05 mm, wavelength conversion of blue light by the YAG:Ce or the $BAl_5O_{12}$ containing Ce (B is at least one kind selected from rare earth elements excluding Ce) is insufficient. Thus, there is concern that it is hard to obtain yellow light. On the contrary, when the thickness exceeds 1 mm, light emitted inside the phosphor cannot be extracted easily. Thus, there is concern that the light emission efficiency deteriorates. Further, the ceramic composite more preferably has a thickness of 0.1 mm to 0.5 mm. Within this range, the light emission efficiency is further improved.

It is preferable that front, back and side surfaces of the ceramic composite are non-machined surfaces. That is, in the ceramic composite, it is preferable that machining such as polishing is not performed on any of the front, back and side surfaces, but the surfaces remain as baked surfaces. Specifically, it is preferable that surface roughness (Ra) in the front, back and side surfaces of the ceramic composite is 0.01 μm or more and 0.3 μm or less. Further, the surface roughness (Ra) in the front, back and side surfaces of the ceramic composite is more preferably 0.1 μm or more and 0.2 μm or less. Within these ranges, the light emission intensity can be further improved without decreasing the transmittance of light.

In addition, since the front, back and side surfaces of the ceramic composite are non-machined surfaces, a bonding agent etc. can enter minute irregularities on the surfaces of the ceramic composite when a phosphor or a projector is produced by using the ceramic composite. Thus, due to an anchor effect, the ceramic composite can be bonded to another member with high mechanical strength.

A phosphor for a projector according to the present invention includes a phosphor layer made of a ceramic composite. Specifically, it is preferable that the phosphor for a projector has a structure in which a transparent substrate such as sapphire, a phosphor layer made of the aforementioned ceramic composite, and a reflection film are provided in this order. The transparent substrate typically has a ring-like shape and various materials can be used without limitation as long as it can transmit excitation light radiated from a light source. The phosphor layer made of the ceramic composite also has a ring-like shape for being matched with the shape of the transparent substrate. As the reflection film, a metal reflection film such as silver, aluminum and platinum or a dielectric porous film may be used.

A light emitting device for a projector according to the present invention includes the aforementioned phosphor for a projector, and a light source by which the phosphor layer of the phosphor is irradiated with excitation light. An example of the light source may include an LED light source.

As has been described, the ceramic composite according to the present invention can be used suitably for the phosphor or the light emitting device for a projector because it can produce yellow light (emission peak wavelength 530 nm or more and 570 nm or less).

EXAMPLE

The present invention will be described below further in detail based on Example. However, the present invention is not limited to the following example.

Examples 1 to 6 and Comparative Example 2

Cerium oxide powder having an average particle size of 0.5 μm and a purity of 99.9%, yttrium oxide powder having a predetermined particle size and a purity of 99.9%, and aluminum oxide powder having a predetermined particle size and a purity of 99.9% were blended at a predetermined ratio shown in Table 1. Thus, raw material power was obtained.

Ethanol, PVB-based binder and glycerin-based plasticizer were added to the raw material powder, and the resulting mixture was pulverized and mixed for 10 hours by a ball mill using aluminum oxide balls. Thus, slurry was produced.

From the slurry thus obtained, a green sheet was produced by a doctor blade method so as to have a predetermined thickness shown in Table 1 after sintering. Next, the produced green sheet was punched to be 100 mm square. After that, the punched green sheet was degreased and calcined in the atmosphere, and then sintered in a vacuum atmosphere. Thus, a sintered body of a polycrystalline ceramic composite was obtained.

Bulk density (JIS C 2141:1992) of each of the obtained sintered bodies was measured by an Archimedes method. After that, a part of the sintered body was pulverized, and a true density was measured by a dry type automatic densimeter (ACCUPYC 1330 made by SHIMADZU CORPORATION). In addition, a part of the sintered body was cleansed, and Y, Al and Ce concentrations were then measured by an ICP emission spectrophotometric analysis method. In addition, a crystal phase in a part of the sintered body was inspected by powder X-ray diffraction. Based on the measurement results of the density, the Y concentration, the Al concentration, the Ce concentration, and the crystal phase of the sintered body, the YAG:Ce content in the composite and the $Al_2O_3$ in the scatterer phase were calculated. Here, the densities of YAG:Ce and $Al_2O_3$ were assumed to be 4.55 $g/cm^3$ and 3.99 $g/cm^3$ respectively, and used in the calculation. In addition, in the surface of the obtained sintered body, the average crystal particle sizes of the phosphor phase and the scatterer phase were measured by an intercept method.

In addition, an Al reflection film was deposited on a back surface of the obtained sintered body, and irradiated from the front side with blue LD light of 1 W and 450 nm. On this occasion, an emission spectrum of a fluorescence converted to the front side was condensed by an integrating sphere, and then measured by a spectroscope ("USB4000 fiber multi-channel spectroscope" manufactured by Ocean Optics Inc.). From the obtained spectrum, emission intensity of 480 nm to 800 nm was calculated. The emission intensity was calculated on the assumption that a measurement result of a YAG:Ce phosphor ("P46-Y3" manufactured by Mitsubishi Chemical Corporation) sealed within commercially available borosilicate glass was 100.

The results are shown in Table 1.

Comparative 1

A sintered body of a polycrystalline ceramic composite was obtained in the same manner as in Example 1, except that the aluminum oxide powder was not used in Example 1. The average particle sizes of a phosphor phase and a scatterer phase were measured, and emission intensity was calculated, in the same manner as in Example 1.

Example 7

A sintered body of a polycrystalline ceramic composite was obtained in the same manner as in Example 1, except that gadolinium oxide having a purity of 99.9% was blended at a predetermined ratio in addition to the cerium oxide powder, the yttrium oxide powder, and the aluminum oxide powder in Example 1. The average particle sizes of a phosphor phase and a scatterer phase were measured, and emission intensity was calculated, in the same manner as in Example 1. On this occasion, the density of $Y_{2.9}Gd_{0.1}Al_5O_{12}$:Ce was assumed to be 4.61 $g/cm^3$ and it was used for the calculation.

Example 8

A sintered body of a polycrystalline ceramic composite was obtained in the same manner as in Example 1, except that lutetium oxide having a purity of 99.9% was blended at a predetermined ratio in place of the yttrium oxide powder in Example 1. The average particle sizes of a phosphor phase and a scatterer phase were measured, and emission intensity was calculated, in the same manner as in Example 1. On this occasion, the density of $Lu_3Al_5O_{12}$:Ce was assumed to be 6.70 $g/cm^3$ and it was used for the calculation.

Example 9

A sintered body of a polycrystalline ceramic composite was obtained in the same manner as in Example 1, except that lutetium oxide having a purity of 99.9% was blended at a predetermined ratio in addition to the cerium oxide powder, the yttrium oxide powder, and the aluminum oxide powder in Example 1. The average particle sizes of a phosphor phase and a scatterer phase were measured, and emission intensity was calculated, in the same manner as in Example 1. On this occasion, the density of $Lu_1Y_2Al_5O_{12}$:Ce was assumed to be 5.27 $g/cm^3$ and it was used for the calculation.

The results of Examples 1 to 9 and Comparatives 1 and 2 are shown in Table 1.

TABLE 1

| | phosphor phase | | | scatterer phase | | | thickness (μm) | emission intensity |
|---|---|---|---|---|---|---|---|---|
| | composition | content (vol %) | particle size (μm) | composition | content (vol %) | particle size (μm) | | |
| Comp. Ex. 1 | $Y_3Al_5O_{12}$:Ce | 100 | 5.2 | — | 0 | — | 300 | 55 |
| Ex. 1 | $Y_3Al_5O_{12}$:Ce | 99 | 3.6 | $Al_2O_3$ | 1 | 1.8 | 300 | 110 |
| Ex. 2 | $Y_3Al_5O_{12}$:Ce | 95 | 2.6 | $Al_2O_3$ | 5 | 1.5 | 300 | 120 |
| Ex. 3 | $Y_3Al_5O_{12}$:Ce | 90 | 2.4 | $Al_2O_3$ | 10 | 1.4 | 300 | 105 |
| Comp. Ex.2 | $Y_3Al_5O_{12}$:Ce | 89 | 4.2 | $Al_2O_3$ | 11 | 1.4 | 300 | 95 |
| Ex. 4 | $Y_3Al_5O_{12}$:Ce | 95 | 1.2 | $Al_2O_3$ | 5 | 1.5 | 300 | 109 |
| Ex. 5 | $Y_3Al_5O_{12}$:Ce | 95 | 5.2 | $Al_2O_3$ | 5 | 1.6 | 300 | 122 |
| Ex. 6 | $Y_3Al_5O_{12}$:Ce | 95 | 15 | $Al_2O_3$ | 5 | 2.0 | 300 | 106 |
| Ex. 7 | $Y_{2.9}Gd_{0.1}Al_5O_{12}$:Ce | 95 | 2.6 | $Al_2O_3$ | 5 | 1.3 | 300 | 103 |
| Ex. 8 | $Lu_3Al_5O_{12}$:Ce | 95 | 2.8 | $Al_2O_3$ | 5 | 1.3 | 300 | 126 |
| Ex. 9 | $Lu_1Y_2Al_5O_{12}$:Ce | 95 | 3.2 | $Al_2O_3$ | 5 | 1.1 | 300 | 129 |
| Ex. 10 | $Y_3Al_5O_{12}$:Ce | 95 | 2.6 | $Al_2O_3$ | 5 | 1.3 | 500 | 110 |
| Ex. 11 | $Y_3Al_5O_{12}$:Ce | 95 | 2.7 | $Al_2O_3$ | 5 | 1.8 | 1000 | 102 |
| Ex. 12 | $Y_3Al_5O_{12}$:Ce | 95 | 2.4 | $Al_2O_3$ | 5 | 1.2 | 50 | 111 |

While the present invention has been described in detail and with reference to specific embodiments thereof, it will be apparent to one skilled in the art that various changes and modifications can be made therein without departing from the spirit and scope of the present invention.

The present application is based on a Japanese patent application No. 2016-filed on Jul. 8, 2016, a Japanese patent application No. 2017-129496 filed on Jun. 30, 2017, and a Japanese patent application No. 2017-131614 filed on Jul. 5, 2017, the content thereof being incorporated herein by reference.

The invention claimed is:

1. A ceramic composite comprising inorganic materials and comprising: a phosphor phase comprising YAG containing Ce; and a scatterer phase comprising a translucent ceramic, wherein:
   the phosphor phase is contained in an amount of 90 vol % or more and 99 vol % or less; and
   the scatterer phase is contained in an amount of 1 vol % or more and 10 vol % or less.

2. The ceramic composite according to claim 1, wherein
   the phosphor phase has an average crystal particle size of 1 μm or more and 15 μm or less, and
   the scatterer phase has an average crystal particle size of 0.5 μm or more and 2 μm or less.

3. A phosphor for a projector, comprising a phosphor layer comprising the ceramic composite described in claim 1.

4. A light emitting device for a projector, comprising the phosphor for a projector described in claim 3, and a light source by which the phosphor layer of the phosphor is irradiated with an excitation light.

5. The ceramic composite according to claim 1, further comprising a thickness of approximately 0.05 mm to approximately 1 mm.

6. The ceramic composite according to claim 1, further comprising one or more surfaces that are non-machined surfaces and comprise surface roughness of approximately 0.01 μm or more and approximately 0.3 μm or less according.

7. A ceramic composite comprising inorganic materials and comprising: a phosphor phase comprising $BAl_5O_{12}$ containing Ce (B is at least one kind selected from rare earth elements excluding Ce); and a scatterer phase comprising a translucent ceramic, wherein:
   the phosphor phase is contained in an amount of 90 vol % or more and 99 vol % or less; and
   the scatterer phase is contained in an amount of 1 vol % or more and 10 vol % or less.

8. The ceramic composite according to claim 7, wherein
   the phosphor phase has an average crystal particle size of 1 μm or more and 15 μm or less, and
   the scatterer phase has an average crystal particle size of 0.5 μm or more and 2 μm or less.

9. A phosphor for a projector, comprising a phosphor layer comprising the ceramic composite described in claim 7.

10. A light emitting device for a projector, comprising the phosphor for a projector described in claim 9, and a light source by which the phosphor layer of the phosphor is irradiated with an excitation light.

11. The ceramic composite according to claim 7, further comprising a thickness of approximately 0.05 mm to approximately 1 mm.

12. The ceramic composite according to claim 7, further comprising one or more surfaces that are non-machined surfaces and comprise surface roughness of approximately 0.01 μm or more and approximately 0.3 μm or less according.

* * * * *